(12) United States Patent
Kakizaki et al.

(10) Patent No.: US 11,799,557 B2
(45) Date of Patent: Oct. 24, 2023

(54) COMMUNICATION APPARATUS, AND OPTICAL TRANSMISSION SYSTEM

(71) Applicant: Nippon Telegraph and Telephone Corporation, Tokyo (JP)

(72) Inventors: Takeshi Kakizaki, Musashino (JP); Fukutaro Hamaoka, Musashino (JP); Masanori Nakamura, Musashino (JP); Takeo Sasai, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 100 days.

(21) Appl. No.: 17/637,691

(22) PCT Filed: Aug. 26, 2019

(86) PCT No.: PCT/JP2019/033199
§ 371 (c)(1),
(2) Date: Feb. 23, 2022

(87) PCT Pub. No.: WO2021/038676
PCT Pub. Date: Mar. 4, 2021

(65) Prior Publication Data
US 2022/0294535 A1    Sep. 15, 2022

(51) Int. Cl.
*H04B 10/54* (2013.01)
*H04L 27/26* (2006.01)

(52) U.S. Cl.
CPC ....... *H04B 10/541* (2013.01); *H04L 27/2605* (2013.01); *H04L 27/2613* (2013.01)

(58) Field of Classification Search
CPC .............................. H04B 10/54; H04B 10/541
See application file for complete search history.

(56) References Cited

U.S. PATENT DOCUMENTS

| 2012/0224851 | A1  | 9/2012  | Takara et al. |
| 2018/0367246 | A1* | 12/2018 | Kakande ............... H04L 1/0042 |
| 2019/0280809 | A1* | 9/2019  | Cho ................... H04L 25/03343 |
| 2021/0359784 | A1* | 11/2021 | Iscan ..................... H04L 1/0042 |

FOREIGN PATENT DOCUMENTS

WO   WO 2011/030897   3/2011

OTHER PUBLICATIONS

Sasai et al., "Experimental Analysis of Laser Phase Noise Tolerance of Uniform 256QAM and Probabilistically Shaped 1024QAM," Optical Fiber Communication Conference (OFC) 2019, Mar. 3, 2019, WID.5, 3 pages.

* cited by examiner

*Primary Examiner* — Nathan M Cors
(74) *Attorney, Agent, or Firm* — Fish & Richardson P.C.

(57) ABSTRACT

A communication device includes an amplitude conversion unit configured to generate a symbol sequence according to a bit sequence, a distribution matching unit configured to add redundant bits to the symbol sequence through probabilistic amplitude shaping (PAS) coding, an insertion unit configured to insert a pilot symbol into the symbol sequence to which the redundant bits have been added and transmit the symbol sequence into which the pilot symbol has been inserted to a transmission path, and a control unit configured to acquire information on the transmission path and change, according to the information on the transmission path, allocation of the redundancy of the PAS coding and the redundancy of the pilot symbol in a range of redundancy that is able to be allocated depending on a predetermined throughput.

4 Claims, 12 Drawing Sheets

Fig. 8

| PARAMETER | VALUE |
|---|---|
| THROUGHPUT T | 400 Gbps |
| MULTI-LEVEL DEGREE M | 64 |
| SAMPLING RATE $f_s$ | 64 Gbaud |
| FEC CODING RATE $R_c$ | 0.826 |

PILOT RATE

COMMUNICATION APPARATUS, AND OPTICAL TRANSMISSION SYSTEM

CROSS-REFERENCE TO RELATED APPLICATIONS

This application is a National Stage application under 35 U.S.C. § 371 of International Application No. PCT/JP2019/033199, having an International Filing Date of Aug. 26, 2019. The disclosure of the prior application is considered part of the disclosure of this application, and is incorporated in its entirety into this application.

TECHNICAL FIELD

The present invention relates to a communication device and an optical transmission system.

BACKGROUND ART

In an optical transmission system, a transmission scheme (for example, a format and a baud rate) for improving performance such as a throughput differs depending on characteristics of a transmission path and an optical front end. A characteristic of the optical front end is, for example, a laser line width (laser amplitude). Control of a multi-level degree of symbols and control of a baud rate are known as a method of optimizing parameters depending on characteristics of a transmission path and an optical front end and improving performance (see PTL 1 and see NPL 1).

CITATION LIST

Patent Literature

PTL 1: WO 2011/030897

Non Patent Literature

NPL 1: T. Sasai, A. Matsushita, M. Nakamura, S. Okamoto, F. Hamaoka, and Y. Kisaka, "Experimental Analysis of Laser Phase Noise Tolerance of Uniform 256QAM and Probabilistically Shaped 1024QAM", in Optical Fiber Communication Conference (OFC) 2019, OSA Technical Digest (Optical Society of America, 2019), paper W1D.5.

SUMMARY OF THE INVENTION

Technical Problem

A limited number of methods are known to improve a specific performance (for example, a throughput only) of an optical transmission system. However, there is no known method of improving the performance of an entire optical transmission system by improving two or more (for example, a throughput and power consumption) of the throughput, the power consumption, and a transmission distance.

In view of the above circumstances, an object of the present invention is to provide a communication device capable of improving two or more of a throughput, power consumption and a transmission distance in an optical transmission system, and the optical transmission system.

Means for Solving the Problem

An aspect of the present invention is a communication device including: an amplitude conversion unit configured to generate a symbol sequence according to a bit sequence; a distribution matching unit configured to add redundant bits to the symbol sequence through probabilistic amplitude shaping (PAS) coding; an insertion unit configured to insert a pilot symbol into the symbol sequence to which the redundant bits have been added and transmit the symbol sequence into which the pilot symbol has been inserted to a transmission path; and a control unit configured to acquire information on the transmission path and change, according to the information on the transmission path, allocation of redundancy of the PAS coding and the redundancy of the pilot symbol in a range of redundancy that is able to be allocated depending on a predetermined throughput.

An aspect of the present invention is an optical transmission system including: a transmission path estimation unit configured to generate information on a transmission path; an amplitude conversion unit configured to generate a symbol sequence according to a bit sequence; a distribution matching unit configured to add redundant bits to the symbol sequence through probabilistic amplitude shaping (PAS) coding; an insertion unit configured to insert a pilot symbol into the symbol sequence to which the redundant bits have been added and transmit the symbol sequence into which the pilot symbol has been inserted to the transmission path; and a control unit configured to acquire information on the transmission path and change, according to the information on the transmission path, allocation of the redundancy of the PAS coding and the redundancy of the pilot symbol in a range of redundancy that is able to be allocated depending on a predetermined throughput.

Effects of the Invention

According to the present invention, it is possible to improve two or more of the throughput, the power consumption, and the transmission distance in an optical transmission system.

BRIEF DESCRIPTION OF DRAWINGS

FIG. 8 is a diagram illustrating an example of a parameter value in the embodiment.

DESCRIPTION OF EMBODIMENTS

An embodiment of the present invention will be described in detail with reference to the drawings.

Hereinafter, probabilistic shaping will be referred to as "PS". Hereinafter, forward error correction will be referred to as "FEC".

Hereinafter, a required signal to noise ratio will be referred to as "RSNR". Hereinafter, amplified spontaneous emission noise will be referred to as "ASE noise".

Hereinafter, generalized mutual information is referred to as "GMI". Hereinafter, normalized generalized mutual information (normalized GMI) is referred to as "NGMI". Hereinafter, an achievable information rate is referred to as "AIR".

Figure 1:
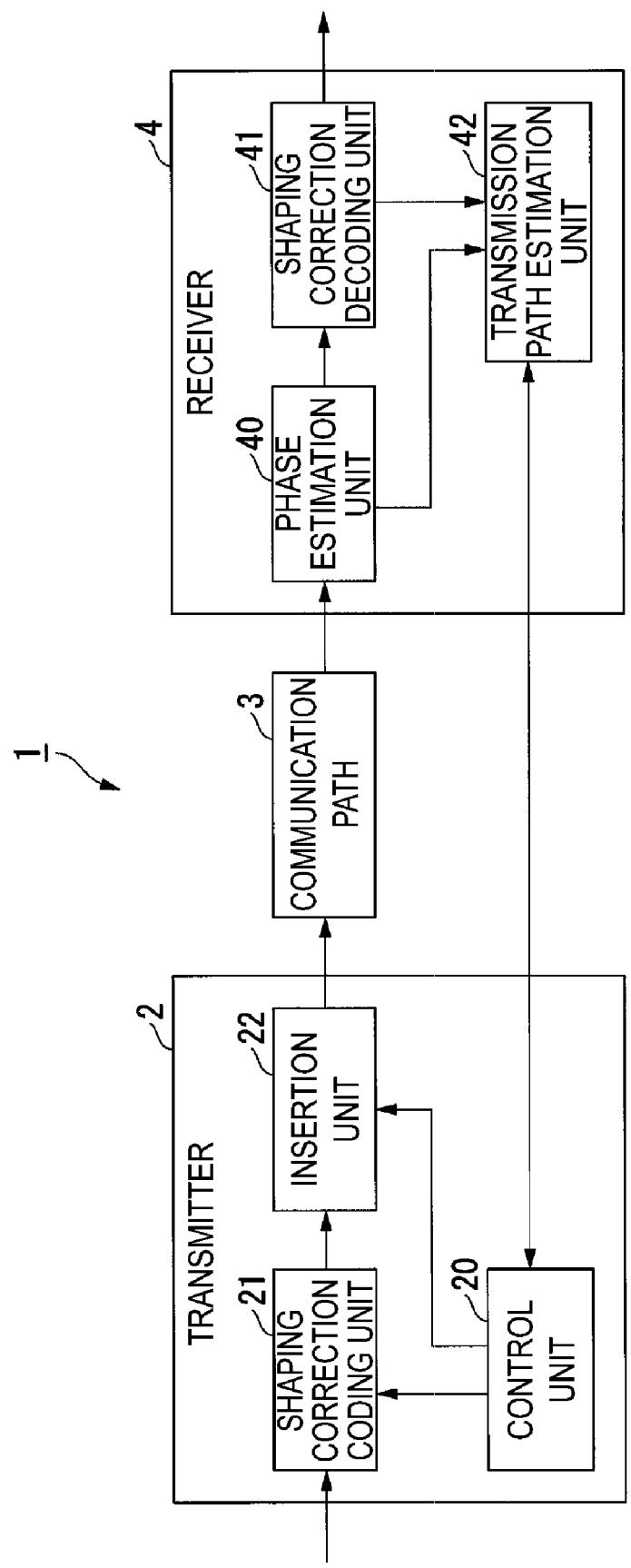
FIG. 1 is a diagram illustrating a configuration example of an optical transmission system according to an embodiment.

FIG. 1 is a diagram illustrating a configuration example of the optical transmission system 1. The optical transmission system 1 is a system that transmits a signal using light. The optical transmission system 1 includes a transmitter 2, a communication path 3, and a receiver 4. The communication path 3 includes, for example, one or more optical amplifiers, one or more optical fibers, one or more optical splitters, and one or more optical filters as respective nodes.

Hereinafter, a path for a signal transmitted in the transmitter, the communication path, and the receiver is referred to as a "transmission path". The transmission path of the optical transmission system 1 is not an additive white Gaussian noise (AWGN) transmission path. ASE noise, phase noise (rotation of a phase), non-linear noise, and band narrowing may occur in the transmission path. Thus, in the optical transmission system 1, it is necessary to compensate for, for example, phase noise. The compensation for the phase noise or the like enables the optical transmission system 1 to improve performance (equalization performance or the like) of the entire optical transmission system 1.

The transmitter 2 is a communication device that transmits a signal using light. The transmitter 2 includes a control unit 20, a shaping correction coding unit 21, and an insertion unit 22. The receiver 4 is a communication device that receives a signal using light. The receiver 4 includes a phase estimation unit 40, a shaping correction decoding unit 41, and a transmission path estimation unit 42.

The control unit 20 may be included in the receiver 4. The transmission path estimation unit 42 may be included in the transmitter 2. The optical transmission system 1 may include the control unit 20 as a control device instead of the control unit 20 included in the transmitter 2. The optical transmission system 1 may include the transmission path estimation unit 42 as a transmission path estimation device instead of the transmission path estimation unit 42 included in the receiver 4.

Figure 2:
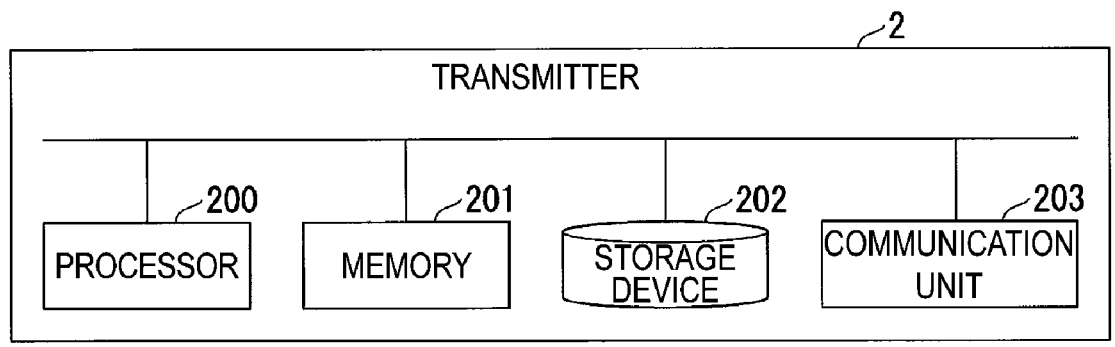
FIG. 2 is a diagram illustrating a hardware configuration example of a transmitter in the embodiment.

FIG. 2 is a diagram illustrating a hardware configuration example of the transmitter 2. The transmitter 2 includes a processor 200, a memory 201, a storage device 202, and a communication unit 203.

Each functional unit of the transmitter 2 illustrated in FIG. 1 is implemented as software by the processor 200 such as a central processing unit (CPU) executing a program developed from the storage device 202, which is a non-volatile recording medium (non-temporary recording medium), to the memory 201. The program may be recorded on a computer-readable recording medium. The computer-readable recording medium is, for example, a non-transitory recording medium such as a portable medium such as a flexible disk, an optical magnetic disk, a read only memory (ROM), or a compact disc read only memory (CD-ROM), and the storage device 202 of a hard disk built into a computer system. The program may be received via the communication unit 203 and a telecommunication line.

The communication unit 203 receives information on the transmission path (hereinafter referred to as "transmission path information") from the receiver 4. The transmission path information includes information on at least one of a signal-to-noise ratio (SNR), an amount of phase noise, communication path distribution, and non-linear noise in the transmission path. The storage device 202 may store, for example, a look-up table created in advance based on a simulation of characteristics of the transmission path.

A part or all of the transmitter 2 may be implemented by using, for example, hardware including an electronic circuit (or circuitry) in which a large scale integration circuit (LSI), an application specific integrated circuit (ASIC), a programmable logic device (PLD), a field programmable gate array (FPGA), or the like has been used.

Figure 3:
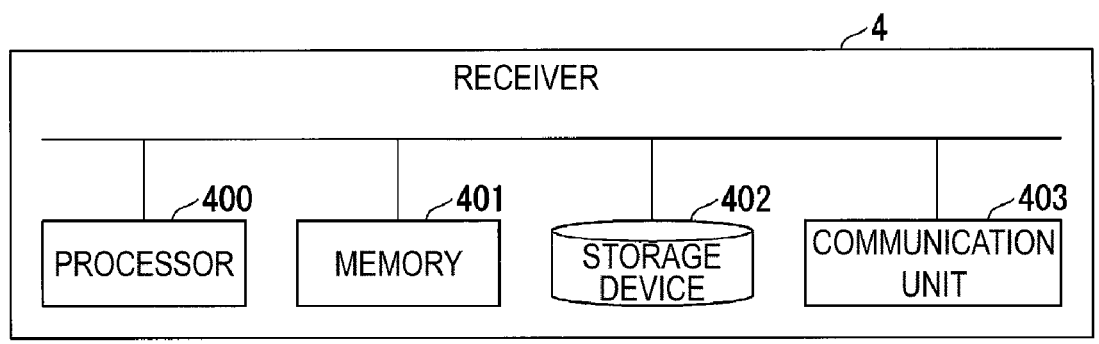
FIG. 3 is a diagram illustrating an example of a hardware configuration of a receiver in the embodiment.

FIG. 3 is a diagram illustrating a hardware configuration example of the receiver 4. The transmitter 2 includes a processor 400, a memory 401, a storage device 402, and a communication unit 403.

Each functional unit of the receiver 4 illustrated in FIG. 1 is implemented as software by the processor 400 such as a CPU executing a program developed from the storage device 402, which is a non-volatile recording medium (non-temporary recording medium), to the memory 401, similar to the transmitter 2. The program may be received via the communication unit 403 and the telecommunication line. The communication unit 403 transmits a signal-to-noise ratio of the transmission path, the amount of phase noise, the communication path distribution, and the non-linear noise to the transmitter 2. The receiver 4 may be implemented by using hardware, like the transmitter 2.

Referring back to FIG. 1, the description of the optical transmission system 1 will be continued.

The optical transmission system 1 feeds the transmission path information from the transmission path estimation unit 42 back to the control unit 20. The transmission path information includes, for example, a signal-to-noise ratio of the communication path 3, a communication path distribution, an amount of phase noise (phase rotation amount) of an optical signal in the communication path 3, and a non-linear noise amount of the communication path 3.

The control unit 20 controls modulation processing in the shaping correction coding unit 21 and the insertion unit 22 depending on the transmission path information. That is, the control unit 20 sets a modulation scheme (format) for the shaping correction coding unit 21 and the insertion unit 22 depending on the transmission path information.

The control unit 20 uses the communication unit 203 to acquire the transmission path information from the transmission path estimation unit 42. The control unit 20 derives an optimal allocation value (ratio) between redundancy (PAS coding rate) of coding of probabilistic amplitude shaping (PAS), which is one PS, and redundancy of a pilot symbol depending on the transmission path information. The coding of PAS is a combination of DM coding and communication path coding. The DM coding is coding for converting the bit sequence into a symbol sequence suitable for a communication path (transmission path). The communication path coding is coding for adding a correction code (FEC parity) to positive and negative bits of the symbol sequence transmitted on the communication path (transmission path).

The control unit 20 sets each set value in the shaping correction coding unit 21 and the insertion unit 22 based on the derived allocation value. The control unit 20 sets, in the shaping correction coding unit 21, a set value of the FEC parity rate (hereinafter referred to as a "FEC rate") depending on the allocation value derived based on the transmission path information. The control unit 20 sets, in the insertion unit 22, a set value of a rate of the pilot symbol (hereinafter referred to as a "pilot rate") depending on the allocation value derived based on the transmission path information.

The shaping correction coding unit 21 and the insertion unit 22 execute modulation processing (PS) based on each set value. For example, the shaping correction coding unit 21 executes processing of adding the correction code (FEC parity) in the coding of PAS based on the set value of the FEC rate. The insertion unit 22 executes processing of inserting the pilot symbol based on the set value of the pilot rate. The control unit 20 improves at least one of a throughput, power consumption, and a transmission distance through modulation processing according to the derived allocation value. This makes it possible for the optical transmission system 1 to improve two or more of the throughput, the power consumption, and the transmission distance and communicate the symbol sequence that is a transmission target.

The shaping correction coding unit 21 acquires a bit sequence "$i^k$" that is a transmission target. The bit sequence is expressed as in Expression (1).

[Math. 1]

$$i^k \in \{0,1\}^k \tag{1}$$

The shaping correction coding unit 21 executes the PAS coding on the bit sequence under the control of the control unit 20. The PAS coding is processing for generating a symbol sequence that is distributed with a non-uniform appearance probability in a complex plane (IQ plane) determined by an I phase (In Phase) and a Q phase (Quadrature Phase) through coding for adding redundant bits to a symbol sequence (amplitude sequence) converted from the bit sequence. The symbol sequence distributed in the IQ plane with a non-uniform appearance probability improves at least one of the throughput, the power consumption, and the transmission distance in the optical transmission system 1.

In the PAS coding, the shaping correction coding unit 21 converts the bit sequence expressed by Expression (1) into "k'" symbol sequences under the control of the control unit 20.

In the PAS coding, the shaping correction coding unit 21 generates a symbol sequence to which redundant bits have been added through DM coding for adding the redundant bits to the symbol sequence (amplitude sequence). That is, the shaping correction coding unit 21 converts the "k'" symbol sequences into "n" symbol sequences under the control of the control unit 20.

In the PAS coding, the shaping correction coding unit 21 executes processing for adding the FEC parity (bits) to a positive or negative "$\{\pm 1\}^{n'}$" of the "n" symbol sequences under the control of the control unit 20. The symbol sequence "$X^{n'}$" to which the FEC parity has been added is expressed as in Expression (2).

[Math. 2]

$$X^n \in X^n \tag{2}$$

The insertion unit 22 acquires the symbol sequence "$X^{n'}$" expressed by Expression (2) from the shaping correction coding unit 21. The insertion unit 22 inserts the pilot symbol into the symbol sequence expressed by Expression (2) under the control of the control unit 20. The symbol sequence "$X^{n'}$" into which the pilot symbol has been inserted is expressed as in Expression (3).

[Math. 3]

$$X^{n'} \in X^{n'} \tag{3}$$

The insertion unit 22 transmits an optical signal of the symbol sequence into which the pilot symbol has been inserted to the communication path 3 (transmission path) as a transmission signal. The communication path 3 transmits an optical signal of a transmission signal including ASE noise and phase noise to the phase estimation unit 40. The phase noise ("Winer-phase noise" model) is expressed as in Equation (4).

[Math. 4]

$$Y(i)=X(i)\exp(-jW(i))+Z(i) \tag{4}$$

Here, "i" indicates a discrete time. "Y(i)" indicates a signal received by the receiver 4 at a discrete time "i". "X(i)" indicates a signal transmitted from the transmitter 2 at the discrete time "i". "exp(−jW (i))" indicates the phase noise in which the "Winer-phase noise" model has been used. "j" indicates an imaginary unit. "Z(i)" indicates AWGN noise (ASE noise caused by a signal amplifier).

Hereinafter, a symbol indicated above a character in the equation is written immediately before the character. For example, a symbol "^" attached above the character "Y" in the equation is described immediately before the character "Y" as in "^y".

The phase estimation unit 40 acquires the optical signal "Y(i)" expressed by Equation (4) from the communication path 3 as a reception signal. The phase estimation unit 40 estimates the phase of the optical signal expressed by Equation (4) based on the pilot symbol of the symbol sequence of the optical signal. The reception signal "^Y(i)" the phase of which has been estimated is expressed as in Equation (5).

[Math. 5]

$$\begin{cases} \hat{Y}(i) = (X(i)\exp(-jW(i)) + Z(i))\exp(j\hat{W}(i')) \\ i \in \left[i'T_{pl}+1, i'^{(T_{pl}+1)} - 1\right] \\ \hat{W}(i'T_{pl}) \\ := \arg\left(\frac{1}{L}\sum_{k \in \left[-\frac{L}{2},\frac{L}{2}\right] \subset \mathbb{N}} \frac{Y(i'(T_{pl}-k))X^*(i(T_{pl}-k))}{|X(i(T_{pl}-k))|^2}\right) \end{cases} \tag{5}$$

Here, "exp(j^W(i'))" indicates an opposite phase (complex conjugate) of an "i'"-th estimated phase noise. The "i'"-th estimated phase noise is an estimated phase noise at a discrete time "i" that satisfies a range of [i'$T_{pl}$+1, i'($T_{pl}$+1)−1]. "$T_{pl}$" indicates an interval (an insertion interval) between the pilot symbols. "^W(i'$T_{pl}$)" is defined using an average length "L". The averaging length is the number of pilot symbols that are averaging targets with respect to the rotation of the phase.

The shaping correction decoding unit 41 (PS-FEC decoder) acquires the reception signal "^Y(i)" the phase of which has been estimated, from the phase estimation unit 40. The shaping correction decoding unit 41 executes decoding processing on the reception signal "^Y(i)" the phase of which has been estimated. The result "^$i^k$" of the decoding processing for the reception signal the phase of which has been estimated is expressed as in Expression (6).

[Math. 6]

$$\hat{i}^k \in \{0,1\}^k \quad (6)$$

The transmission path estimation unit 42 acquires an estimated value of the phase of the optical signal (reception signal) from the phase estimation unit 40. The transmission path estimation unit 42 may acquire a result "$\hat{i}^{k'}$" of decoding processing for the reception signal the phase of which has been estimated, from the shaping correction decoding unit 41. The transmission path estimation unit 42 generates the transmission path information based on at least one of the estimated value of the phase of the optical signal and a result of the decoding processing for the reception signal the phase of which has been estimated. The transmission path estimation unit 42 feeds the transmission path information back to the control unit 20.

Figure 4:
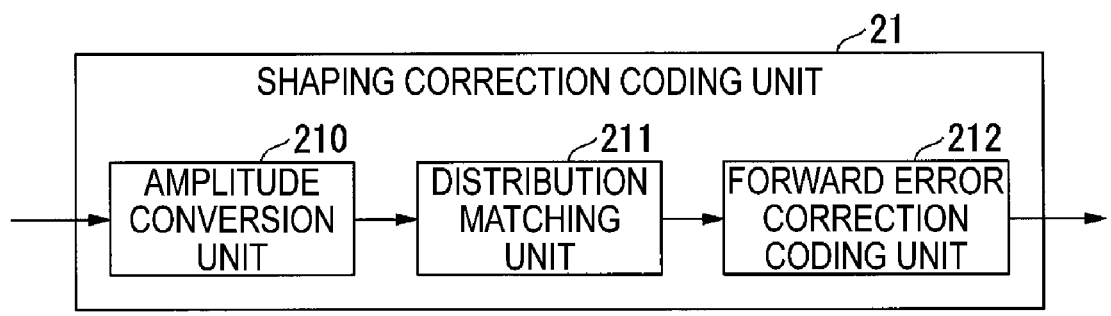
FIG. 4 is a diagram illustrating a configuration example of a shaping correction coding unit in the embodiment.

Next, details of the shaping correction coding unit 21 will be described. FIG. 4 is a diagram illustrating a configuration example of the shaping correction coding unit 21 (PS-FEC coder). The shaping correction coding unit 21 includes an amplitude conversion unit 210, a distribution matching unit 211 (distribution matcher: DM), and a forward error correction coding unit 212.

Shannon capacity "C" is expressed as in Equation (7). Here, "SNR" indicates a signal-to-noise ratio.

[Math. 7]

$$C = \frac{1}{2}\log_2(1 + SNR) \quad (7)$$

A distribution of appearance probabilities of a symbol (signal point) for achieving the Shannon capacity is expressed as in Expression (8). That is, a distribution of the appearance probabilities of a symbol "X" of the transmission signal follows a distribution in which 0 is an average and (P+N) is a variance.

[Math. 8]

$$X \sim \mathcal{N}_{(0,P+N)} \quad (8)$$

Figure 5:
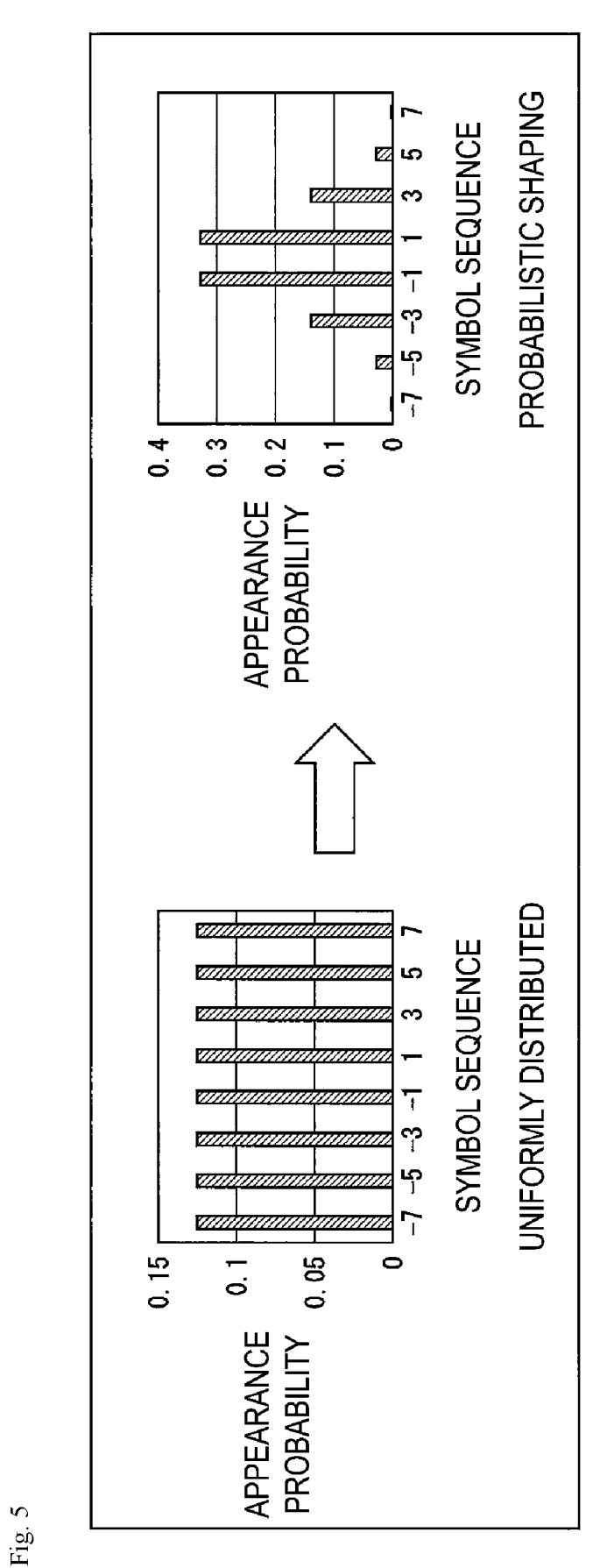
FIG. 5 is a diagram illustrating an example of a distribution of appearance probabilities in the embodiment.

FIG. 5 is a diagram illustrating an example of the distribution of the appearance probabilities. When a distribution of appearance probabilities of symbols is uniform on the IQ plane, the AIR has not reached a Shannon limit. A laser line width changes depending on a value of the symbol sequence. In FIG. 5, the larger the absolute value of the symbol sequence, the thicker the laser line width. The symbol sequence distributed with a non-uniform appearance probability on the IQ plane improves two or more of the throughput, the power consumption, and the transmission distance in the optical transmission system 1.

In FIG. 4, the shaping correction coding unit 21 generates a symbol sequence that is distributed with an appearance probability that improves the performance of the entire optical transmission system 1 on the IQ plane through probabilistic amplitude shaping (PAS), which is one probabilistic shaping (PS).

The amplitude conversion unit 210 converts the bit sequence ("k" bits) expressed by Expression (1) into a "k'" symbol sequences "$A^{k'}$" expressed by Expression (9).

[Math. 9]

$$A^{k'} \in \{a_1, a_2, \ldots, a_m\}^{k'} \quad (9)$$

The distribution matching unit 211 (DM) acquires "k'" symbol sequence "$A^{k'}$" from the amplitude conversion unit 210. The distribution matching unit 211 converts the "k'" symbol sequence "$A^{k'}$" into "n" symbol sequence "$B^{n}$" expressed by Expression (10).

[Math. 10]

$$B^n \in \{a_1, a_2, \ldots, a_m\}^n \quad (10)$$

A DM coding rate "$OH_{DM}$", which is a coding rate of "n" symbol sequence "$B^{n}$", is defined as in Expression (11).

[Math. 11]

$$OH_{DM} := \frac{n}{k'} - 1 \quad (11)$$

The DM coding rate "$OH_{DM}$" satisfies Expression (12).

[Math. 12]

$$\frac{OH_{DM} + 2}{OH_{DM} + 1} < H(X) \quad (12)$$

Here, "H(X)" indicates an amount of information per symbol "X" of the transmission signal. Hereinafter, the amount of information "H(X)" follows the signal-to-noise ratio of the transmission path, an amount of information "$\varepsilon_{dm}$" of the symbol sequence of the distribution matching unit 211, an amount of information "$D_{dm}$" of the bit sequence of a decoding circuit of the shaping correction decoding unit 41 (a reverse processing unit of the distribution matching unit 211), and a communication path distribution "W(Y|X)". The communication path distribution indicates a distribution of the phase noise in the communication path 3. The communication path 3 is an AWGN transmission path.

The redundancy of PAS coding (PAS coding rate) "$R_{ps}$" is expressed as a sum of the DM coding rate "$OH_{DM}$" and the redundancy of coding of the correction code (FEC coding rate).

The forward error correction coding unit 212 acquires a sequence "$B^{n}$" of "n" symbols expressed by Expression (10) from the distribution matching unit 211. The forward error correction coding unit 212 adds an FEC parity to the positive or negative "{±1}$^{n}$" of the sequence "$B^{n}$" of the "n" symbols expressed by Expression (10). The forward error correction coding unit 212 transmits the symbol sequence "$X^{n}$" represented by Expressions (2) and (13) to the insertion unit 22.

[Math. 13]

$$X^n \in (\{\pm 1\}\lambda\{a_1, a_2, \ldots, a_m\})^n \quad (13)$$

Figure 6:
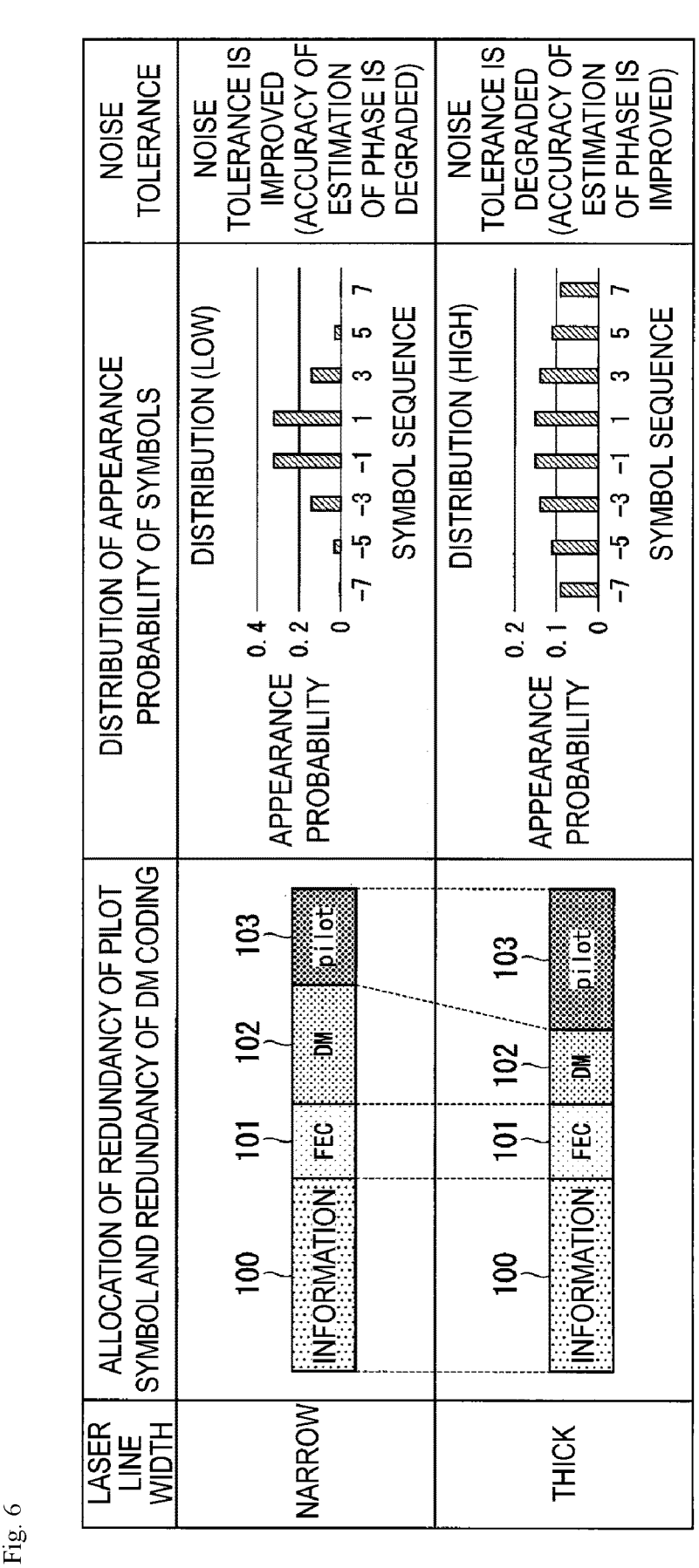
FIG. 6 is a diagram illustrating an example of change in allocation of an interval of pilot symbols and redundancy of coding of distribution matching (DM) in an embodiment.

FIG. 6 is a diagram illustrating an example of change in allocation of an interval (redundancy) between the pilot symbols and the redundancy of coding of distribution matching (DM). FIG. 6 shows a laser line width, allocation of redundancy (interval) of the pilot symbol and redundancy of coding of the distribution matching, a distribution of the appearance probabilities of the symbol, and noise tolerance.

In FIG. 6, a comparison diagram for information 100 "information", a correction symbol 101 "FEC", a distribution matching symbol 102 "DM", and a pilot symbol 103 is shown for each laser line width as an example of the allocation of the redundancy of the pilot symbol and the redundancy of the coding of the distribution matching. In FIG. 6, as an example, the redundancy of coding (coding rate) of the correction symbol 101 "FEC" is fixed.

The information 100 is information determined depending on the bit sequence of Expression (1). For example, the information 100 is a symbol sequence (amplitude sequence) expressed by Expression (10). The correction symbol 101 is added to the symbol sequence by the forward error correction coding unit 212 depending on the set value derived by the control unit 20. The distribution matching symbol 102 is added to the symbol sequence by the distribution matching unit 211 depending on the set value derived by the control unit 20. The pilot symbol 103 is added to the symbol sequence by the insertion unit 22 depending on the set value derived by the control unit 20.

When a multi-level degree "M" and a sampling rate "$f_s$" are fixed, there is redundancy that can be added to the symbol sequence depending on a required throughput "T". There is a trade-off relationship between the redundancy of the pilot symbol and the redundancy of the PAS coding. The control unit 20 allocates the redundancy that can be added to the symbol sequence as the redundancy of the pilot symbol and the redundancy of the PAS coding so that noise tolerance of the optical signal according to the symbol sequence is improved.

When the redundancy of the FEC parity (FEC coding rate) is fixed, the noise tolerance is improved when the redundancy of PAS coding is higher. When the redundancy of the pilot symbol for phase estimation is higher, the accuracy of the estimation of the phase is improved.

Next, details of the phase estimation unit 40 will be described.

Figure 7:
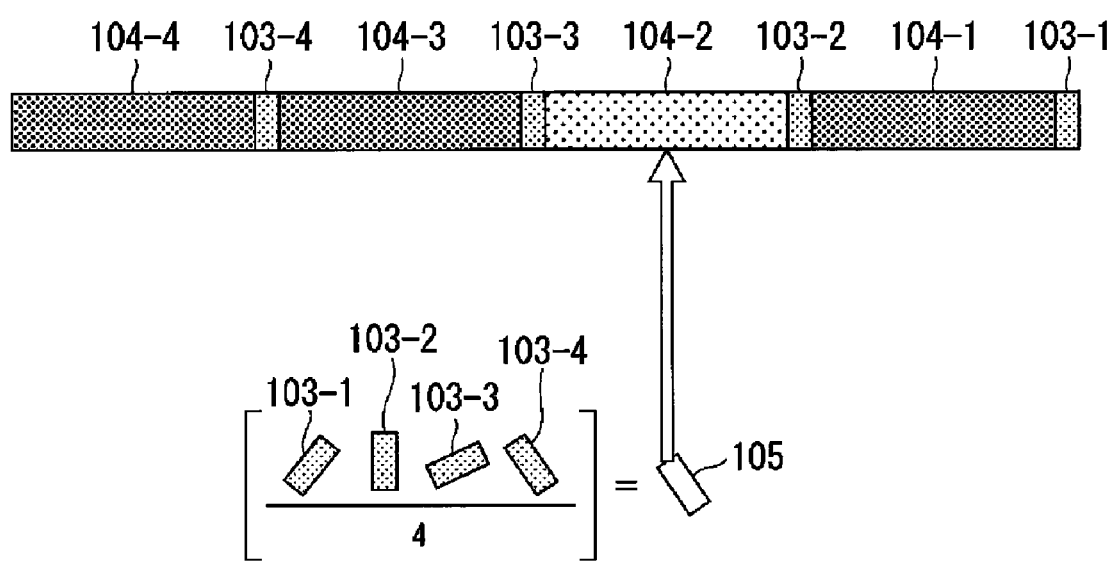
FIG. 7 is a diagram illustrating an example of estimation of a phase in the embodiment.

FIG. 7 is a diagram illustrating an example of estimation of a phase. FIG. 7 shows the pilot symbol 103 and a symbol sequence 104. The symbol sequence 104 includes, for example, the information 100, the correction symbol 101 "FEC", and the distribution matching symbol 102 "DM". In FIG. 7, the average length "L" is 4. The average length differs from the interval between the pilot symbols. The interval between the pilot symbols is a length of the symbol sequence 104.

The phase estimation unit 40 estimates the phase of the optical signal expressed by Equation (4) based on the pilot symbol of the symbol sequence of the optical signal. When the phase noise is estimated using the pilot symbol, the phase estimation unit 40 needs to know the symbol sequence transmitted from the transmitter 2. Thus, the symbol sequence transmitted from the transmitter 2 needs to be fed forward to the phase estimation unit 40. The transmitter 2 and the phase estimation unit 40 share information in advance about the symbol transmitted from the transmitter 2 to the phase estimation unit 40.

The phase estimation unit 40 derives an average value of the phase rotation. In FIG. 7, the phase estimation unit 40 derives the average value of the phase rotation (pilot symbol 105) for the pilot symbols 103-1 to 103-4. The phase estimation unit 40 multiplies, for example, the central symbol sequence 104-2 of the transmitted symbol sequences 104-1 to 104-4 by the average value of the phase rotation. That is, the phase estimation unit 40 derives the reception signal the phase of which has been estimated, as in Equation (5).

Next, results of a numerical experiment will be described.

FIG. 8 is a diagram illustrating an example of a parameter value. In the numerical experiment, the throughput "T" is 400 Gbps as an example. The multi-level degree "M" of the symbol is 64 as an example. The sampling rate "$f_s$" is 64 Gbaud as an example. The redundancy "$R_c$" of the FEC parity (FEC coding rate) is 0.826 as an example.

Figure 9:
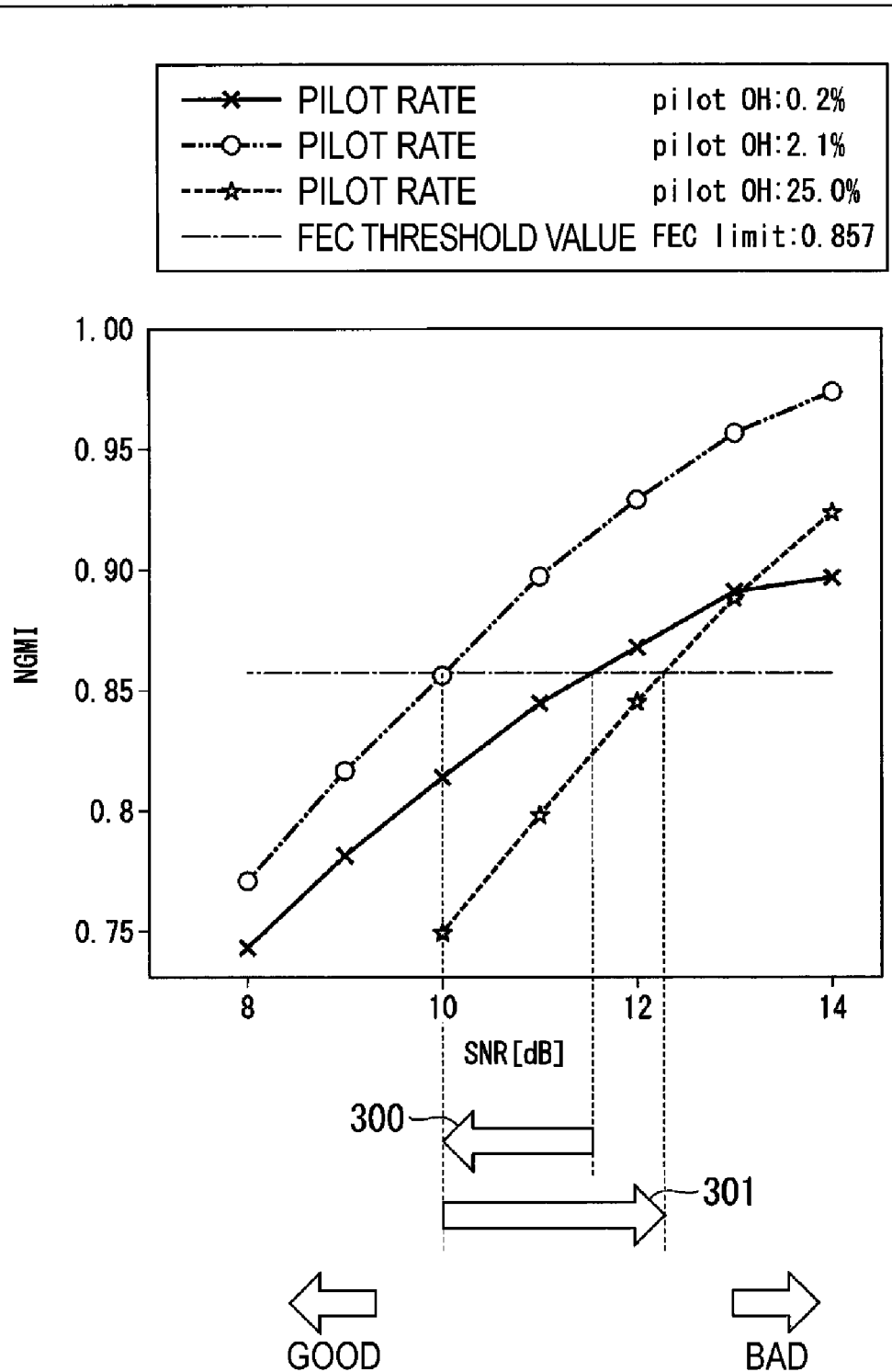
FIG. 9 is a diagram illustrating an example of a relationship between NGMI and SNR in the embodiment.

FIG. 9 is a diagram illustrating an example of a relationship between NGMI and SNR. That is, FIG. 9 is a diagram illustrating dependence (100 kHz) on SNR in NGMI. NGMI is expressed by Expression (14).

[Math. 14]

$$NGMI := 1 - H(X) - \frac{GMI}{m} \quad (14)$$

$$m := \log_2 M$$

GMI is expressed as in Expression (15).

[Math. 15]

$$GMI := \max\left(H(X) - \sum_{i=1,\ldots,m} H(B_i \mid Y), 0\right) \quad (15)$$

When the pilot rate is too low (the redundancy of the pilot symbol is too low), the accuracy of the estimation of the phase noise is degraded and thus, RSNR is low (bad). When the pilot rate "Pilot OH" increases from 0.2% to 2.1% as indicated by an arrow 300, the accuracy of the estimation of the phase noise improves and thus, RSNR for achieving "NGMI=0.857" becomes high (improved).

When the pilot rate is too high (the redundancy of the pilot symbol is too high), the redundancy of PAS coding is not high and thus, the RSNR is low (bad). When the pilot rate "Pilot OH" increases from 2.1% to 25.0% as indicated by an arrow 301, the redundancy of PAS decreases and thus, RSNR for achieving "NGMI=0.857" becomes low (worse).

Figure 10:
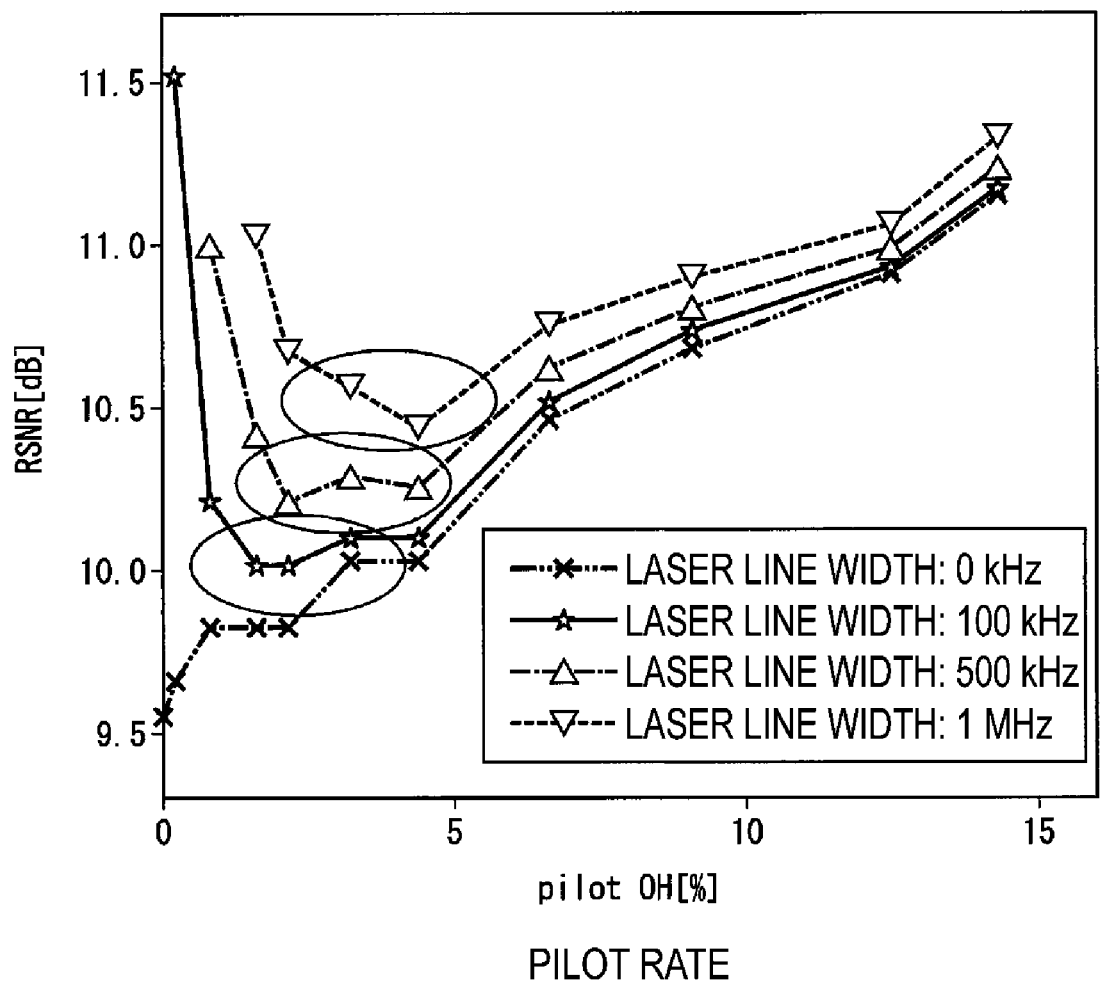
FIG. 10 is a diagram illustrating an example of a relationship between a pilot rate and RSNR in each laser line width in the embodiment.

FIG. 10 is a diagram illustrating an example of a relationship between the pilot rate and RSNR for each laser line width. An optimal pilot rate differs depending on the laser line width, as shown in RSNR corresponding to respective locations surrounded by ellipses in FIG. 10. The control unit 20 sets the pilot rate depending on the laser line width. The control unit 20 sets the redundancy of the PAS coding depending on the laser line width.

Figure 11:
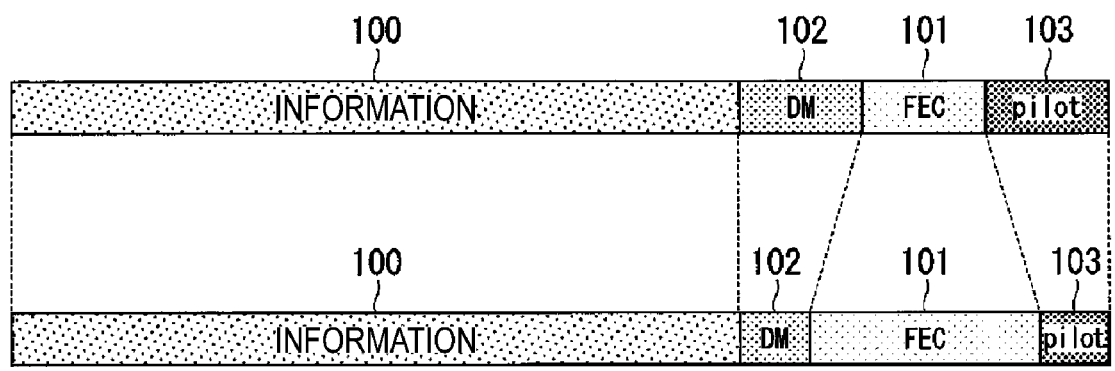
FIG. 11 is a diagram illustrating an example of allocation of redundancy in the embodiment.

FIG. 11 is a diagram illustrating an example of allocation of redundancy. There is a trade-off relationship between the redundancy of the pilot symbol and the redundancy (coding rate) of the PAS coding. Thus, when the multi-level degree "M" of the symbol, the baud rate "B", and the sampling rate "$f_s$" are fixed, there is an optimal allocation value (ratio) that satisfies a value of a predetermined objective function in a range of the redundancy that can be allocated depending on the required throughput "T". The redundancy that can be allocated is, for example, the redundancy in which the throughput of the symbol sequence to which the redundant bits have been added becomes equal to or less than the throughput "T" when the multi-level degree and the sampling rate have been fixed.

The control unit 20 derives a set value depending on an optimal allocation value that satisfies the value of the predetermined objective function. The control unit 20 improves two or more of the throughput, the power consumption, and the transmission distance in the optical transmission system 1 by using the set value. The required throughput "T" is expressed by Equation (16). The required throughput "T" is determined in advance. Further, the multi-level degree "M" of the symbol may be determined in advance.

[Math. 16]

$$T = BR_{pl}(H(X) - (1-R_c)\log M) \quad (16)$$

Here, "B" indicates the baud rate. The baud rate is determined depending on communication rates of the transmitter 2 and the receiver 4. "$R_{pl}$" indicates the pilot rate. "$R_{pl}$" is determined depending on the phase noise and the non-linear noise. "$R_c$" indicates the FEC rate. "$R_c$" is determined depending on a signal-to-noise ratio, a target value of a bit error rate (BER), an amount of information "ε" of the symbol sequence of the forward error correction coding unit 212, an amount of information "D" of the bit sequence of the shaping correction decoding unit 41, and the communication path distribution "W(Y|X)".

When the multi-level degree "M" of the symbol, the baud rate "B", and the sampling rate "$f_s$" are fixed and the improvement of the equalization performance (transmission distance) is required, the control unit 20 increases the redundancy of the pilot symbol. When the improvement of equalization performance (transmission distance) is not so required and the power consumption is required to be curbed, the redundancy (FEC coding rate) of the FEC parity for reducing the power consumption is increased.

The control unit 20 acquires the transmission path information from the transmission path estimation unit 42. The control unit 20 acquires a look-up table created in advance through a simulation in which the transmission path information is used.

Association of a sum of two or more of the throughput, a reciprocal of the power consumption, and the transmission distance (equalization performance) with the allocation value of the redundancy is registered in the lookup table depending on parameters of the objective function. The parameters of the objective function include parameters regarding a transmitter and a receiver, parameters regarding the transmission path, and parameters regarding constraints.

For example, the association between the sum of the throughput and the reciprocal of the power consumption and the allocation value of the redundancy is registered in the lookup table depending on the parameters regarding the transmission path. In this case, the control unit 20 can select the allocation value of the redundancy for maximizing the sum of the throughput and the reciprocal of the power consumption from the lookup table depending on the parameters regarding the transmission path.

The parameters regarding the transmitter and the receiver include, for example, respective parameters such as redundancy of an FEC parity (FEC rate), redundancy of DM coding (DM rate), redundancy of a pilot symbol (pilot rate), a baud rate, a multi-level degree, an FEC scheme, an amplitude of laser input to the transmitter 2 (modulator), an amplitude of laser input to a drive amplifier of the laser, an optical power of an input or output in the transmitter and the receiver, and the number of subcarriers of an optical signal.

The parameters regarding the transmission path include, for example, respective parameters such as a gain of the optical amplifiers of the communication path 3, a power of laser input to the optical fiber of the communication path 3 (fiber input power), and the optical filters (the number of stages of nodes through which the optical signal passes).

The parameters regarding the constraints include, for example, a signal-to-noise ratio, an amount of ASE noise, an amount of phase noise, an amount of non-linear noise, and a band narrowing amount in the transmission path (the transmitter 2, the communication path 3, and the receiver 4).

The control unit 20 selects an allocation value (ratio) for improving a sum of two or more of the throughput, the reciprocal of the power consumption, and the transmission distance (equalization performance) from the look-up table based on the transmission path information. The control unit 20 may iteratively select the allocation value with which a sum of the combinations becomes largest from the lookup table based on the transmission path information. The control unit 20 determines each set value according to the allocation value.

At a timing of introduction of the optical transmission system 1, the control unit 20 may output a set value (initial value) to the transmitter 2 and the receiver 4. The control unit 20 may iteratively search the lookup table for an optimal set value. The control unit 20 may update the respective set values of the transmitter 2 and the receiver 4 based on a result of the search.

Figure 12:
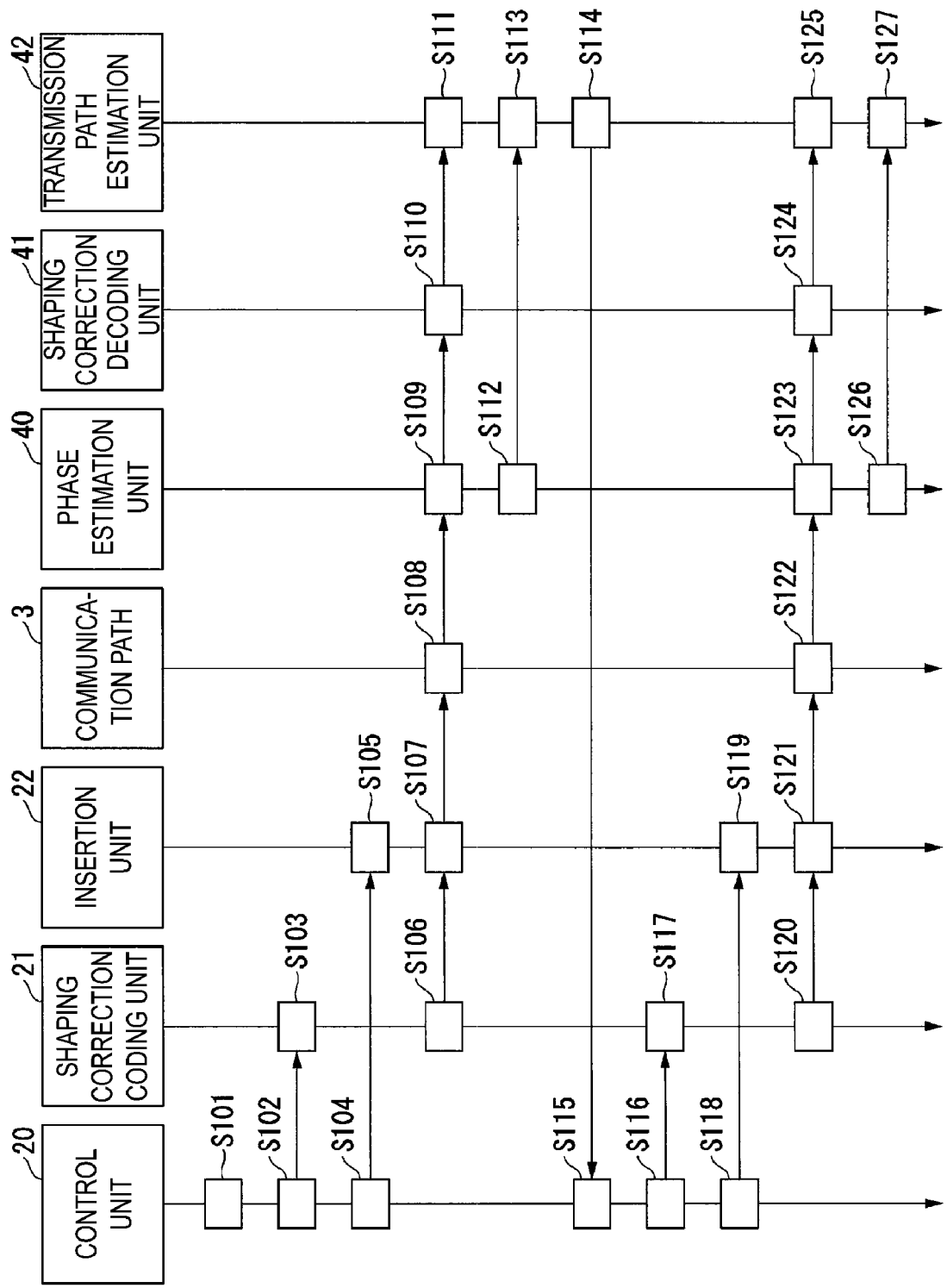
FIG. 12 is a flowchart illustrating an operation example of the optical transmission system according to the embodiment.

Next, an example of an operation of the optical transmission system 1 will be described. FIG. 12 is a flowchart illustrating an operation example of the optical transmission system. The control unit 20 and the phase estimation unit 40 share information in advance about the symbol transmitted from the transmitter 2 to the receiver 4.

The control unit 20 acquires the required throughput value (step S101). The control unit 20 sets a control signal for allowing the receiver 4 to generate the transmission path information and a set value (initial value) in the shaping correction coding unit 21 (step S102). The shaping correction coding unit 21 acquires the control signal and the set value (step S103). The control unit 20 sets a set value (initial value) in the insertion unit 22 (step S104). The insertion unit 22 acquires the set value (step S105).

The shaping correction coding unit 21 transmits a control signal to the insertion unit 22 (step S106). The insertion unit 22 transmits an optical signal of the control signal to the communication path 3 using a control channel (step S107). The communication path 3 transmits the optical signal of the control signal to the phase estimation unit 40 using the control channel. For example, ASE noise and phase noise occur in the optical signal of the control signal (step S108).

The phase estimation unit 40 acquires the control signal from the communication path 3. The phase estimation unit 40 transmits the control signal to the shaping correction decoding unit 41 (step S109). The shaping correction decoding unit 41 may transmit a result of the decoding processing for the control signal to the transmission path estimation unit 42 (step S110). The transmission path estimation unit 42 may acquire the result of the decoding processing for the control signal (step S111).

The phase estimation unit 40 transmits an estimated value of a phase of the control signal to the shaping correction decoding unit 41 (step S112). The transmission path estimation unit 42 estimates the characteristics of the transmission path based on at least one of a result of decoding processing for the control signal and the estimated value of the phase of the control signal. The transmission path estimation unit 42 generates, for example, the transmission path information including the signal-to-noise ratio of the transmission path, the amount of phase noise, the communication path distribution, and the non-linear noise (step S113). The transmission path estimation unit 42 feeds the transmission path information back to the control unit 20 (step S114).

The control unit 20 acquires the transmission path information from the transmission path estimation unit 42 (step S115). The control unit 20 derives the allocation value (ratio) between the redundancy of the pilot symbol for phase estimation and the redundancy of the PAS coding based on the transmission path information. The control unit 20 outputs a set value of the shaping correction coding unit 21 (for example, a set value of a modulation scheme of the shaping correction coding unit 21) to the shaping correction coding unit 21 based on the redundancy of the PAS coding according to the derived allocation value (step S116). The shaping correction coding unit 21 updates the set value referred to by the shaping correction coding unit 21 (step S117).

The control unit 20 outputs a set value of the insertion unit 22 (for example, a set value of a modulation scheme of the insertion unit 22) to the insertion unit 22 based on the redundancy of the pilot symbol according to the derived allocation value (step S118). The insertion unit 22 updates the set value referred to by the insertion unit 22 (step S119).

The shaping correction coding unit 21 transmits the symbol sequence "X'''" to which the redundant bits and the FEC parity have been added, to the insertion unit 22 (step S120). The insertion unit 22 transmits the optical signal of the symbol sequence into which the pilot symbol has been inserted, for the symbol sequence to which the redundant bits and the FEC parity have been added, to the communication path 3 as a transmission signal (step S121). The communication path 3 transmits an optical signal of the transmission signal including ASE noise and phase noise to the phase estimation unit 40 as a reception signal (step S122).

The phase estimation unit 40 acquires the optical signal "Y(i)" expressed by Equation (4) from the communication path 3 as a reception signal. The phase estimation unit 40 transmits the symbol sequence of the optical signal to the shaping correction decoding unit 41 (step S123). The shaping correction decoding unit 41 may transmit a result of the decoding processing for the symbol sequence of the optical signal to the transmission path estimation unit 42 (step S110). The transmission path estimation unit 42 may acquire the result of the decoding processing for the symbol sequence of the optical signal (step S125).

The phase estimation unit 40 estimates the phase of the optical signal expressed by Equation (4) based on the pilot symbol of the symbol sequence of the optical signal (step S126). The transmission path estimation unit 42 estimates the characteristics of the transmission path based on at least one of the result of decoding processing for the symbol sequence of the optical signal and the estimated value of the phase of the optical signal. The transmission path estimation unit 42 generates the transmission path information including the signal-to-noise ratio of the transmission path, the amount of phase noise, the communication path distribution, and the non-linear noise (step S127).

As described above, the communication device (the transmitter 2) of the embodiment includes the amplitude conversion unit 210, the distribution matching unit 211, the insertion unit 22, and the control unit 20. The amplitude conversion unit 210 generates a symbol sequence "$A^{k'}$" according to the bit sequence "$i^{k'}$". The distribution matching unit 211 adds redundant bits to the symbol sequence "$A^{k'}$" through the PAS coding. That is, the distribution matching unit 211 converts the "k'" symbol sequence "$A^{k'}$" into "n" symbol sequences "B'''" expressed by Expression (10) through DM coding. The insertion unit 22 inserts the pilot symbol into the symbol sequence "B'''" to which the redundant bits have been added. The insertion unit 22 may insert the pilot symbol into the symbol sequence "X'''" based on the symbol sequence "B'''" to which the redundant bits have been added. The insertion unit 22 transmits the symbol sequence into which the pilot symbol has been inserted to the communication path 3 (transmission path). The control unit 20 acquires the transmission path information. The control unit 20 changes the allocation of the redundancy of the PAS coding and the redundancy of the pilot symbol in a range of redundancy that can be allocated depending on the predetermined throughput, depending on the transmission path information. For example, the control unit 20 selects the allocation value from the lookup table depending on the transmission path information. The transmission path information is, for example, information on at least one of the signal-to-noise ratio, the amount of phase noise, the communication path distribution, and the non-linear noise in the transmission path.

This makes it possible to improve at least one of the throughput, the power consumption, and the transmission distance in the optical transmission system 1.

Although the embodiment of the present invention has been described in detail with reference to the drawings, a specific configuration is not limited to the embodiment, and a design or the like in a range that does not depart from the gist of the present invention is included.

INDUSTRIAL APPLICABILITY

The present invention is applicable to an optical transmission system.

REFERENCE SIGNS LIST

1 Optical transmission system
2 Transmitter
3 Communication path
4 Receiver
20 Control unit
21 Shaping correction coding unit
22 Insertion unit
40 Phase estimation unit
41 Shaping correction decoding unit
42 Transmission path estimation unit
100 Information
101 Correction symbol
102 Distribution matching symbol
103 Pilot symbol
104 Symbol sequence
105 Pilot symbol
200 Processor
201 Memory
202 Storage device
203 Communication unit
210 Amplitude conversion unit
211 Distribution matching unit
212 Forward error correction coding unit
300 Arrow
301 Arrow
400 Processor
401 Memory
402 Storage device
403 Communication unit

The invention claimed is:
1. A communication device comprising:
an amplitude conversion unit, including one or more processors, configured to generate a symbol sequence according to a bit sequence;
a distribution matching unit, including one or more processors, configured to add redundant bits to the symbol sequence through probabilistic amplitude shaping (PAS) coding;

an insertion unit, including one or more processors, configured to insert a pilot symbol into the symbol sequence to which the redundant bits have been added and transmit the symbol sequence into which the pilot symbol has been inserted to a transmission path; and a control unit, including one or more processors, configured to acquire information on the transmission path and change, according to the information on the transmission path, allocation of redundancy of the PAS coding and redundancy of the pilot symbol in a range of redundancy that is able to be allocated depending on a predetermined throughput.

2. The communication device according to claim 1, wherein the information on the transmission path is information on at least one of a signal-to-noise ratio, an amount of phase noise, a communication path distribution, and a non-linear noise in the transmission path.

3. An optical transmission system comprising:

a transmission path estimation unit, including one or more processors, configured to generate information on a transmission path;

an amplitude conversion unit, including one or more processors, configured to generate a symbol sequence according to a bit sequence;

a distribution matching unit, including one or more processors, configured to add redundant bits to the symbol sequence through probabilistic amplitude shaping (PAS) coding;

an insertion unit, including one or more processors, configured to insert a pilot symbol into the symbol sequence to which the redundant bits have been added and transmit the symbol sequence into which the pilot symbol has been inserted to the transmission path; and a control unit, including one or more processors, configured to acquire information on the transmission path and change, according to the information on the transmission path, allocation of the redundancy of the PAS coding and redundancy of the pilot symbol in a range of redundancy that is able to be allocated depending on a predetermined throughput.

4. The optical transmission system according to claim 3, wherein the information on the transmission path is information on at least one of a signal-to-noise ratio, an amount of phase noise, a communication path distribution, and a non-linear noise in the transmission path.

* * * * *